United States Patent
Nishino et al.

[11] Patent Number: 6,089,278
[45] Date of Patent: *Jul. 18, 2000

[54] TUBE FOR FUEL TRANSPORTATION

[75] Inventors: Todomu Nishino; Yuji Nakabayashi; Akashi Nakatsu, all of Nabari; Toshiaki Kasazaki; Eiji Inoue, both of Yamatokoriyama, all of Japan

[73] Assignee: Nitta Moore Company, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/665,572

[22] Filed: Jun. 18, 1996

Related U.S. Application Data

[63] Continuation of application No. 08/284,156, Aug. 2, 1994, abandoned.

[30] Foreign Application Priority Data

Aug. 3, 1993 [JP] Japan ................................ 5-192610

[51] Int. Cl.⁷ .................................................... F16L 11/04
[52] U.S. Cl. .................... 138/137; 138/141; 138/DIG. 1; 138/DIG. 7; 428/36.91
[58] Field of Search ..................... 138/137, 141, 138/DIG. 1, DIG. 7; 428/36.91

[56] References Cited

U.S. PATENT DOCUMENTS

| | | | |
|---|---|---|---|
| 4,806,351 | 2/1989 | Sugimoto | 428/421 |
| 4,942,906 | 7/1990 | Igarashi | 138/141 |
| 5,076,329 | 12/1991 | Brunnhofer | 138/DIG. 7 |
| 5,084,314 | 1/1992 | Igarashi | 138/DIG. 7 |
| 5,170,011 | 12/1992 | Martucci | 138/137 |
| 5,258,213 | 11/1993 | Mügge et al. | |
| 5,313,987 | 5/1994 | Röber et al. | |
| 5,362,530 | 11/1994 | Kitami | 138/143 |
| 5,362,570 | 11/1994 | Rober | 428/36.91 |
| 5,425,817 | 6/1995 | Mugge et al. | 138/137 |
| 5,474,109 | 12/1995 | Stoeppelmann et al. | 138/137 |

FOREIGN PATENT DOCUMENTS

| | | |
|---|---|---|
| 287 839 | 10/1988 | European Pat. Off. . |
| 336 806 | 10/1989 | European Pat. Off. . |
| 0 567 947 A1 | 11/1993 | European Pat. Off. . |
| 2 689 956 | 10/1993 | France . |
| 41 12 662 | 10/1992 | Germany . |
| 41 37 430 | 5/1993 | Germany . |
| 41 37 431 | 5/1993 | Germany . |
| 4-224384 | 8/1992 | Japan . |
| 5169602 | 7/1993 | Japan . |
| 5-220910 | 8/1993 | Japan . |
| 5220911 | 8/1993 | Japan . |
| 5220912 | 8/1993 | Japan . |
| 5-245993 | 9/1993 | Japan . |
| 5-279566 | 10/1993 | Japan . |

*Primary Examiner*—Randall E. Chin
*Attorney, Agent, or Firm*—Dianne E. Reed; Reed & Associates

[57] ABSTRACT

A tube for fuel transportation according to the present invention includes an innermost layer comprising one selected from the group consisting of fluorine type resins and polyamide type resins, a middle layer comprising a polyalkylene naphthalate resin, an outer layer comprising a thermoplastic resin or a thermoplastic elastomer, and an adhesive layer formed between the innermost layer and the middle layer. Polybutylene naphthalate may be used as the polyalkylene naphthalate resin. The tube for fuel transportation according to the present invention has excellent barrier action against fuels and is highly kink-proof.

12 Claims, 1 Drawing Sheet

TUBE FOR FUEL TRANSPORTATION

This application is a continuation of application Ser. No. 08/284,156 filed on Aug. 2, 1994 now abandoned.

BACKGROUND OF THE INVENTION

1. Field of the Invention

The present invention relates to a tube for transporting fuels, and more particularly to a tube for use as a fuel tube in transportation vehicles such as automobiles. The tube according to the present invention has excellent barriering properties (barrier action) against not only a gasoline-based fuel, but also a mixed fuel including alcohols, and is kink-proof to an extent that it can be used in a bent state in a relatively small space.

2. Description of the Related Art

Tubes having a multilayer structure in which a metal pipe, a rubber hose, a single layer tube of nylon, and various resins are layered have conventionally been used as tubes for transporting fuels in a transportation vehicle such as an automobile.

On the other hand, the realization that it may be difficult to secure an ample supply of gasoline in the future has led to research for substitute fuels in the place of gasoline. As one such substitute fuel, mixed fuels in which alcohols, such as methanol, are added to gasoline have been studied, and have already been put to practical use in the West. Use of methanol as a substitute fuel has attracted much attention because it is expected to provide an improved octane value and contribute to the increased cleanness of the exhaust gas.

In particular, in view of the current state of the atmospheric environment, it is desirable to minimize the amount of fuel to be discharged from a transportation vehicle. This has led to the enforcement of increasingly strict emission regulations. Therefore, tubes are desired which hardly permit fuels to escape therethrough.

Fuel tubes are often incorporated inside the housing so as to prevent them from being damaged from the impact of a collision and to protect them against flying stones, fire, etc. originating from the outside. In such cases, it is particularly required to substantially eliminate the transmission of gas through the fuel tube because the odor of the transmitted gas might cause discomfort to people in the vehicle, or might even catch fire when the concentration thereof becomes sufficiently high.

On the other hand, automobiles allow less and less space for tubes to be incorporated, so that it is required that the tubes be provided in such a manner as to avoid other equipment in the engine housing.

Moreover, as is well known, transportation vehicles are required to have improved resistance against rust and a reduced mass in view of the demands for increased durability and improved fuel consumption.

A conventional tube for fuel transportation is disclosed in Japanese Laid-Open Patent Publication No. 4-224384. This tube for fuel transportation is a single layer tube composed of a polyester type resin or alternatively a multilayer tube whose innermost layer is composed of a polyester type resin. In this tube for fuel transportation, polybutylene terephthalate, which has excellent barrier action, is used as the polyester type resin so as to improve the barrier action of the tube.

German Patent Application Publication Nos. 4112662, 4137430, 4137431, and 4215608 each disclose a conventional tube for fuel transportation having a multilayer structure including an inner layer and an outer layer composed essentially of polyamide and a middle layer composed of linear crystalline polyester.

In the above-mentioned Patent Application Publications, it is proposed to form the middle layer of a mixture of linear crystalline polyester and polyamides or compounds having various reactive groups in order to improve the adhesion between the respective layers.

However, the inventors of the present invention have confirmed the following drawbacks of a tube for fuel transportation having a multilayer structure including an innermost layer composed of polybutylene terephthalate:

i) There is a limit to the improvement of barrier action against the fuel. Specifically, a fuel for a transportation vehicle, such as an automobile, is generally a mixture of various components. Therefore, a tube may show excellent barrier action for a fuel of one composition but not for a fuel of another composition, thus resulting in insufficient overall barrier action for fuels.

ii) A tube disclosed in an example of the above-mentioned Japanese Laid-Open Patent Publication No. 4-224384, in which the inner layer is composed of polybutylene terephthalate and the outer layer is composed of nylon 12, has poor adhesion between the inner and outer layers, thus resulting in poor kink-proofness. Tubes for fuel transportation of this kind, used for transportation vehicles, are likely to be used in a very small space and bent in a circle with a small radius. Therefore, these tubes are required to be highly kink-proof in order to have practicality.

iii) In cases where a tube for fuel transportation whose innermost layer is composed of a polyester type resin such as polybutylene terephthalate is used for transportation of a mixed fuel including alcohols, the innermost layer may deteriorate through hydrolysis caused by a small amount of moisture contained in the alcohols. Such a tube has the problem of poor durability.

Moreover, an experiment conducted by the inventors of the present invention has revealed the following drawback of a tube for fuel transportation having a multilayer structure including a middle layer composed of a mixture of polybutylene terephthalate and various compounds in order to realize improved adhesion with the polyamide constituting the inner and outer layers: There is a limit to the improvement of the barrier action against fuels. Specifically, as described later with reference to the Comparative Examples, a tube including a middle layer composed of a linear crystalline polyester which is either polybutylene terephthalate or a mixture obtained by mixing polybutylene terephthalate with a polyamide resin, a maleic acid anhydride modified ELM, an ethylene-ethylacrylate-glycidyl methacrylate copolymer, or the like has poor barrier action against fuels although the middle layer is formed of polybutylene terephthalate.

SUMMARY OF THE INVENTION

The present invention was made in order to solve the above-mentioned problems, and one objective thereof is to provide a tube for fuel transportation including an innermost layer selected from the group consisting of fluorine type resins and polyamide type resins, a middle layer composed essentially of a polyalkylene naphthalate resin, an outer layer composed essentially of a thermoplastic resin or a thermoplastic elastomer, and an adhesive layer disposed between the innermost layer and the middle layer.

In one embodiment of the invention, the polyalkylene naphthalate resin is polybutylene naphthalate.

In another embodiment of the invention, the thickness of the middle layer accounts for 5% to 20% of the total thickness of the tube.

In still another embodiment of the invention, the innermost layer is composed essentially of a polyamide type resin, and the adhesive layer is at least one selected from the group consisting of thermoplastic polyurethanes, polyetherblockamides, polyesterblockamides, modified polyolefins, polyester copolymers, and polyester type elastomers.

In still another embodiment of the invention, the innermost layer is composed essentially of a polyamide type resin, and the adhesive layer is composed essentially of an adhesive resin including a polyamide type resin and a crystalline polyester or a thermoplastic polyester elastomer, the polyamide type resin and the crystalline polyester or the thermoplastic polyester elastomer being mixed at a ratio, by volume, in the range of 70/30 to 30/70.

In still another embodiment of the invention, a miscibilizer, selected from the group consisting of: epoxy compounds including glycidyl group or glycidyl ether group; acid anhydrides; compounds including oxazoline group, carboxylic acid group, isocyanate group, or a (meth) acrylic acid or (meth)acrylic acid ester structure; and compounds including amino group or hydroxyl group, is melt-mixed in the adhesive layer.

In still another embodiment of the invention, the innermost layer is composed essentially of a fluorine type resin, and the adhesive layer is composed essentially of an adhesive resin composed essentially of at least one selected from the group consisting of fluorine type resins, flexible fluorine type resins, and fluorine type rubbers, and at least one selected from the group consisting of crystalline polyester type resins and polyester type elastomers.

In still another embodiment of the invention, the innermost layer is composed essentially of a fluorine type resin, and the adhesive layer is composed essentially of an adhesive resin including: (A) at least one selected from the group consisting of fluorine type resins, flexible fluorine type resins, and fluorine type rubbers; and (B) at least one selected from the group consisting of crystalline polyester type resins and polyester type elastomers, (A) and (B) being mixed at a ratio, by volume, in the range of 80/20 to 20/80.

Thus, the invention described herein makes possible the advantages of (1) providing a tube for fuel transportation which has sufficient barrier action and chemical resistance against current gasoline fuels and substitute fuels, such as mixed fuels including methanol; (2) providing a tube for fuel transportation which has improved kink-proofness and is particularly suitable as a tube for fuel transportation in a transportation vehicle such as an automobile; and (3) providing a tube for fuel transportation which, because of the innermost layer being composed essentially of a fluorine type resin or a polyamide type resin, has excellent hydrolysis resistance and resistance against fuels and which does not degrade over time, thereby achieving a drastically improved durability as compared with the durability of conventional tubes for fuel transportation.

These and other advantages of the present invention will become apparent to those skilled in the art upon reading and understanding the following detailed description with reference to the accompanying figures.

DESCRIPTION OF THE PREFERRED EMBODIMENTS

Figure 1:
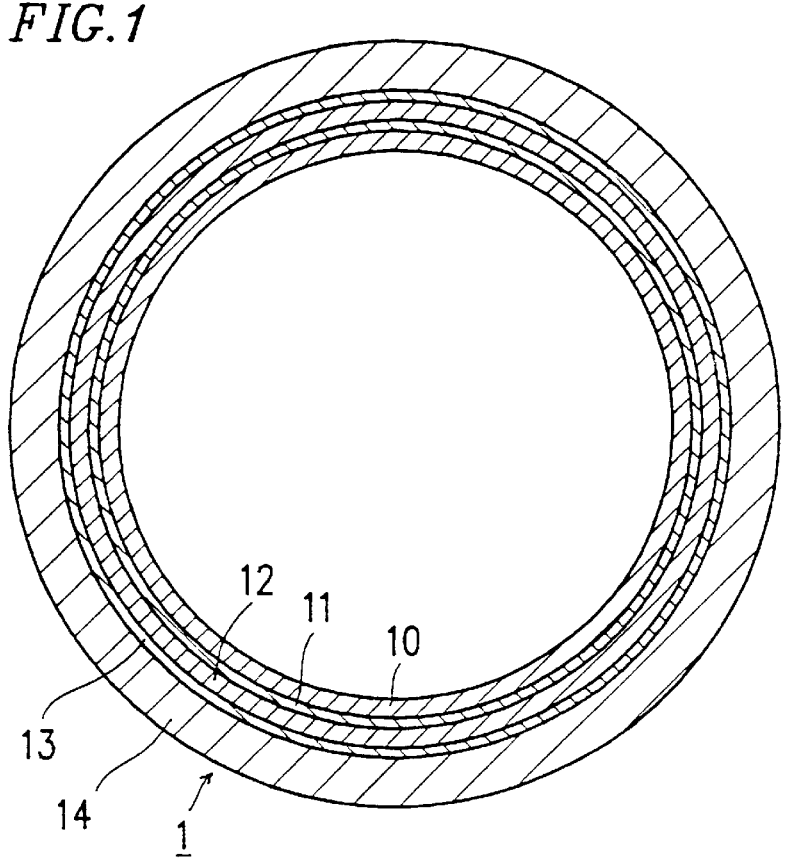
FIG. 1 is a transverse cross-sectional view showing a tube for fuel transportation according to an example of the present invention.

FIG. 1 is a transverse cross-sectional view showing a tube 1 for fuel transportation according to an example of the present invention. The tube 1 for fuel transportation has a multilayer structure including five layers: an innermost layer 10, an adhesive layer 11, a middle layer 12, an adhesive layer 13, and an outer layer 14 (listed from the inside).

The tube 1 can be fabricated by the following method. Five extruders, namely, one for the formation of the innermost layer 10, one for the formation of the adhesive layer 11, one for the formation of the middle layer 12, one for the formation of the adhesive layer 13, and one for the formation of the outer layer 14 are disposed around a mold. Melted resins are extruded by the respective extruders so as to be led through slits in the mold, the resins being layered upon one another. Thereafter, the melted resins are discharged at one end of the mold. The melted tube having a five-layer structure is adjusted while being cooled in a sizing bath so as to have predetermined dimensions.

Figure 2:
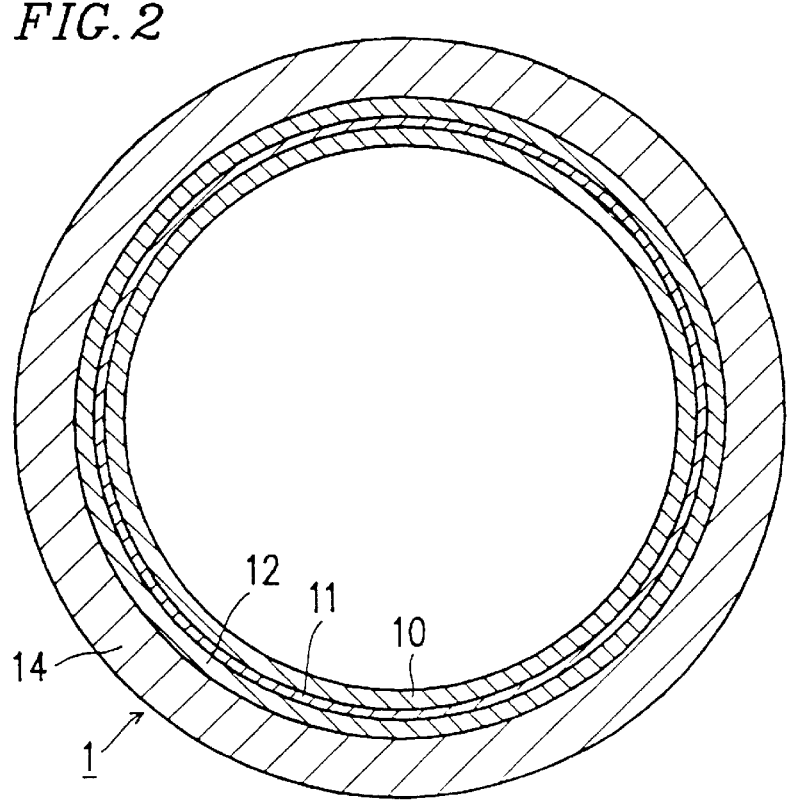
FIG. 2 is a transverse cross-sectional view showing a tube for fuel transportation according to another example of the present invention.

The present invention encompasses, in addition to the above-described tube 1 having a five-layer structure, a tube 1 for fuel transportation having a multilayer structure including four layers and not including the adhesive layer 13, as shown in FIG. 2. This four-layer tube 1 can be fabricated by the same method by which the tube 1 shown in FIG. 1 is fabricated except for using four extruders, instead of five.

The resins included in the tube are formed in a temperature range of about 150° C. to about 320° C., and more preferably about 190° C. to about 280° C.

The present invention does not intend to provide any particular limitation as to the dimensions of either tube 1 for fuel transportation. For example, in the case of fabricating a tube for fuel transportation having a multilayer structure including five layers and having an outer diameter of 8 mm and an inner diameter of 6 mm, the tube for fuel transportation being for use in an automobile, the preferred thicknesses of the layers may be as follows:

the innermost layer 10: 0.1 to 0.3 mm, the adhesive layer 11: 0.02 to 0.1 mm, the middle layer 12: 0.05 to 0.2 mm, the adhesive layer 13: 0.02 to 0.1 mm, and the outer layer 14: 0.3 to 0.8 mm.

In the case of fabricating a tube for fuel transportation having a multilayer structure including fours layers and having an outer diameter of 8 mm and an inner diameter of 6 mm, the tube for fuel transportation being for use in an automobile, the preferred thicknesses of the layers may be as follows:

the innermost layer 10: 0.05 to 0.2 mm, the adhesive layer 11: 0.02 to 0.1 mm, the middle layer 12: 0.05 to 0.2 mm, and the outer layer 14: 0.5 to 0.85 mm.

If the thickness of the inner layer 10 is smaller than the smaller than the above-mentioned ranges, the tube 1 may have a decreased affinity in conjunction with a joint which follows, thus possibly resulting in the disruption of the inner layer by the joint when the tube 1 is connected thereto or during use of the tube 1. If the thickness of the inner layer 10 is larger than the larger of the above-mentioned ranges, the flexibility of the entire tube 1 may decrease, and the fabrication cost may increase.

If the thickness of the adhesive layer 11 is smaller than the above-mentioned range, it becomes difficult to conduct stable molding of the tube 1, resulting in nonuniform thickness of the respective layers. This may result in nonuniform adhesion between the layers. If the thickness of the adhesive layer 11 is larger than the above-mentioned range, the thicknesses of the innermost layer 10, the middle layer 12, and the outer layer 14 must be decreased in order to obtain a tube having a predetermined diameter and a predetermined thickness, thus resulting in deviation from the intended tube characteristics according to the present invention.

If the thickness of the middle layer 12 is smaller than the above-mentioned range, sufficient barrier action against fuels cannot be obtained. If the thickness of the middle layer 12 is larger than the above-mentioned range, the flexibility of the entire tube 1 may decrease, and the shock resistance of the tube 1 may decrease.

If the thickness of the adhesive layer 13 is smaller than the above-mentioned range, it becomes difficult to conduct stable molding of the tube 1, leading to nonuniform thickness of the respective layers. This may result in nonuniform adhesion between the layers. If the thickness of the adhesive layer 13 is larger than the above-mentioned range, the thicknesses of the innermost layer 10, the middle layer 12, and the outer layer 14 must be decreased in order to obtain a tube having a predetermined diameter and a predetermined thickness, thus resulting in deviation from the intended tube characteristics according to the present invention.

If the thickness of the outer layer 14 is smaller than the smaller of the above-mentioned ranges, the weather resistance of the tube 1 may decrease. Moreover, the inner layers of the tube 1 may be left vulnerable to impacts from stones flying from the outside, and the entire tube 1 may have insufficient resistance against chemical agents (e.g. antifreezing agents, antirust agents, etc.). If the thickness of the outer layer 14 is larger than the larger of the above-mentioned range, the thicknesses of the innermost layer 10 and the middle layer 12 must be decreased in order to obtain a tube having a predetermined diameter and a predetermined thickness, thus resulting in deviation from the intended tube characteristics according to the present invention.

Hereinafter, the innermost layer 10, the adhesive layer 11, the middle layer 12, the adhesive layer 13, and the outer layer 14 will be described individually.

The Innermost Layer 10

Fluorine type resins and polyamide type resins can be used for the innermost layer 10. The thickness of the innermost layer 10 should preferably account for 5% to 30% of the total thickness of the tube 1 for fuel transportation.

Fluorine Type Resins

Fluorine type resins themselves have good corrosion resistance and chemical resistance. Moreover, they have excellent non water-absorbance, friction resistance, non-adhesiveness, self-lubrication, heat resistance, cold resistance, weather resistance, and the like.

Among the fluorine type resins, however, polytetrafluoroethylene has a melt viscosity of $10^3$ to $10^{12}$ poise at 380° C., and has poor thermoplastic properties, although categorized as a thermoplastic resin. Therefore, the usual melt molding technique cannot be used for polytetrafluoroethylene.

Accordingly, fluorine type resins that are thermoplastic and applicable to an extrusion processing are used for the tube for fuel transportation according to the present invention. Examples of such fluorine type resins include: polyvinylidene fluoride resin (hereinafter referred to as PVDF), ethylene-tetrafluoroethylene copolymer resins (hereinafter referred to as ETFE), polyvinyl fluoride resins (hereinafter referred to as PVF), ethylene-chlorotrifluoroethylene copolymer resins (hereinafter referred to as E-CTFE), chlorotrifluoroethylene resins (hereinafter referred to as PCTFE), tetrafluoroethylene-hexafluoropropylene copolymers (hereinafter referred to as FEP), tetrafluoroethylene-perfluoroalcoxyethylene copolymers (hereinafter referred to as PFA), and tetrafluoroethylene-hexafluoropropylene-perfluoroalcoxyethylene copolymers (hereinafter referred to as EPA).

Among the above-mentioned fluorine type resins, PVDFs and ETFEs are especially preferable in view of their molding facility and adhesion to other resins.

A PVDF, as mentioned above, is defined to be a homopolymer of vinylidene fluoride or a copolymer of vinylidene with a monomer which is copolymerizable with vinylidene fluoride. Examples of monomers that are copolymerizable with vinylidene fluoride include vinyl fluoride, tetrafluoroethylene, trifluorochloroethylene, and hexafluoropropylene.

As for ETFEs, those in which the molar ratio of ethylene to tetrafluoroethylene is in the range of 30/70 to 60/40 are preferable. ETFEs may include copolymers with, if necessary, small amounts of other monomers which are copolymerizable therewith.

Polyamide Type Resins

Polyamide type resins that are applicable to the present invention are, preferably, linear polyamides having high molecular weights. The polyamide may be a homopolyamide, a copolyamide, or a mixture of a homopolyamide and a copolyamide.

Examples of such polyamides include homopolyamides, copolyamides, or mixtures of homopolyamides and copolyamides having an amide repetition unit represented by the following Formula I or Formula II:

$$—CO—R^1—NH— \hspace{2em} \text{I}$$

$$—CO—R^2—CONH—R^3—NH \hspace{2em} \text{II}$$

where $R^1$, $R^2$, and $R^3$ each represent a straight-chain alkylene group.

Herein, in terms of barrier action and fuel resistance for gasoline fuels and mixed fuels containing alcohols, those homopolyamides, copolyamides, or mixtures thereof in which the number of amide groups per 100 carbon atoms is in the range of 3 to 30, and more preferably in the range of 4 to 25, are preferable as the polyamide type resins to be used in the present invention.

Examples of suitable homopolyamides include polycapramide (nylon 6), poly-ω-aminoheptanic acid (nylon 7), poly-ω-aminononane acid (nylon 9), poly-undecaneamide (nylon 11), polylaurinelactam (nylon 12), polyethylene diamineadipamide (nylon 2, 6), polytetramethylene adipamide (nylon 4, 6), polyhexamethylene adipamide (nylon 6, 6), polyhexamethylene sebacamide (nylon 6, 10), polyhexamethylene dodecamide (nylon 6, 12), polyoctamethylene adipamide (nylon 8, 6), polydecamethylene adipamide (nylon 10, 6), polydecamethylene sebacamide (nylon 10, 10), and polydodecamethylene dodecamide (nylon 12, 12).

Examples of suitable copolyamides include: caprolactam/laurinelactam copolymers, caprolactam/hexamethylene diammoniumadipate copolymers, laurinelactam/hexamethylene diammoniumadipate copolymers, hexamethylene diammoniumadipate/hexamethylene diammoniumsebacate copolymers, ethylene diammoniumadipate/ hexamethylene diammoniumadipate copolymers, and caprolactam/hexamethylene diammoniumadipate/hexamethylene diammoniumsebacate copolymers.

Moreover, it is applicable to add plasticizers such as aromatic sulfone amides, p-hydroxybenzoic acids, and esters, elastomer components having low elasticity, and lactams to the above-mentioned polyamide type resins so as to impart flexibility thereto.

Examples of such elastomer components include: ionomer resins, modified polyolefin type resins, thermoplastic polyurethanes, polyetherblockamides, polyesterblockamides, polyetheresteramide type elastomers, polyester type elastomers, modified stylene type thermoplastic elastomers, modified acrylic rubbers, and modified ethylene-propylene rubbers. Among these elastomers components, those which have good compatibility with polyamide type resins and a flexural elasticity of 3000 kgf/cm$^2$ or less are preferable. The elastomers can be used alone or in combination with one another.

The above-described materials for the innermost layer 10 may, if necessary, include various additives such as antioxidants, colorants, anti-static agents, conductive materials, flame retarders, reinforcers, stabilizers, and processing aids.

The Middle Layer 12

Polyalkylene naphthalate resins are used for the middle layer 12. The polyalkylene naphthalate resins to be used in the present invention are defined as resins that can be fabricated by condensation polymerizing naphthalene dicarboxylic acid or an ester forming derivative thereof with diols in the presence of a catalyst and under certain reaction conditions.

Examples of such naphthalene dicarboxylic acids include naphthalene-2,6-dicarboxylic acid, naphthalene-2,7-dicarboxylic acid, and naphthalene-1,5-dicarboxylic acid. One or more kinds of these naphthalene dicarboxylic acids can be used.

Examples of the above-mentioned ester forming derivatives include naphthalene-2,6-dicarboxylic acid methyl.

Alkylene glycols are preferably used as the above-mentioned diols. Examples of such alkylene glycols include ethylene glycol, propylene glycol, trimethyl glycol, tetramethylene glycol, pentamethylene glycol, and hexamethylene glycol.

A particularly preferable polyalkylene naphthalate resin to be used for the present invention is polyethylene naphthalate or polybutylene naphthalate in which naphthalene-2,6-dicarboxylic acid is used as the naphthalate dicarboxylic acid and in which ethylene glycol or 1,4 butanediol is used as the alkylene glycol.

In cases where the tube 1 for fuel transportation is used as a fuel tube for automobiles, polybutylene naphthalate is particularly preferably used for the middle layer 12 in terms of barrier action, mechanical strength of the tube, molding facility, and the like.

The strength, resistance against impacts, and stretching properties of a polyalkylene naphthalate resin improve as the viscosity of the polyalkylene naphthalate resin increases. Therefore, preferable polyalkylene naphthalate resins are those which have an intrinsic viscosity of 0.7 or more, and more preferably an intrinsic viscosity in the range of 0.9 to 1.5 (the intrinsic viscosity being measured for a solution of 0.005 g/ml at 35° C. with o-chlorophenol used as a solvent, according to ASTM D 2857).

Unless the advantages of the tube 1 for fuel transportation such as the barrier action against fuels are undermined, the polyalkylene naphthalate resin may alternatively be a copolymer in which a part of either the naphthalene dicarboxylic acid as a polyester component or alkylene glycol is substituted by a third component such as other dicarboxylic acids, oxycarboxylic acids, or dioxy compounds.

Examples of such dicarboxylic acids include naphthalene dicarboxylic acids, terephthalic acids, isophthalic acids, adipic acids, oxalic acids, and diphenyletherdicarboxylic acid.

Examples of oxycarboxylic acids include p-oxybenzoic acids and p-oxyethoxybenzoic acids.

Examples of dioxy compounds include dihydric alcohols such as ethylene glycol, propylene glycol, trimethyl glycol, tetramethyl glycol, pentamethylene glycol, hexamethylene glycol, diethylene glycol, bisphenol A and polyalkylene glycols such as polyethylene glycol and polytetramethylene glycol.

The polyalkylene naphthalate resin may, if necessary, melt-include other resins, elastomer components, or compounds having a functional group for improving the adhesion to the other layers, and/or include various additives such as antioxidants, colorants, anti-static agents, flame retarders, reinforcers, stabilizers, and processing aids, as long as the barrier action against fuels of the tube 1 is not reduced.

The thickness of the middle layer 12 should preferably account for 5% to 20% of the total thickness of the tube 1 for fuel transportation. If the thickness of the middle layer 12 accounts for less than 5% of the total thickness of the tube 1, the barrier action for fuels decreases. If the thickness of the middle layer 12 accounts for more than 20% of the total thickness of the tube 1, the flexibility of the entire tube 1 may decrease and the shock resistance of the tube 1 may decrease.

Polyalkylene naphthalate resins have such characteristics that the breaking strength and breaking stretch thereof increase as the thickness thereof decreases. The shock resistance and toughness of the tube 1 become satisfactory by prescribing the thickness thereof to be in the above mentioned range.

The Outer Layer 14

In cases where a fluorine type resin or a polyamide type resin is used for the innermost layer 10 and a polyalkylene naphthalate resin is used for the middle layer 12, as described above, the outer layer 14 may be composed of any thermoplastic resin, and the present invention does not intend to provide any further limitation to the material for the outer layer 14.

Examples of materials for the outer layer 14 include thermoplastic resins such as polyolefin type resins such as polyamide resins, fluorine type resins, polyester resins, polyurethane type elastomers, polyamide type elastomers, polyester type elastomers, polyacetal type resins, polyethylenes, and polypropylenes.

In cases where the outer diameter of the tube 1 is 25 mm or less, the total thickness of the tube 1 should account for 5% to 20% of the outer diameter of the tube 1, and the thickness of the outer layer 14 should account for 50% to 85% of the total thickness of the tube 1 for the following reasons. If the total thickness of the tube 1 is excessively small, as compared with the outer diameter of the tube 1, the tube 1 may buckle when bent, thereby interrupting the flow of any fluid that is transported through the tube 1. Moreover, a joint is generally required in order to connect an end of the tube 1 to another piece of equipment; such a joint requires the tube 1 to have an appropriate thickness.

Moreover, the outer layer 14 is required to have weather resistance, damage-proofness, friction resistance, flexibility, inflammability, colorability, printability, anti-static properties, electrical conductivity, electric insulation, and pressure resistance. In order to impart the outer layer 14 with such properties, it is applicable to provide a further layer having such properties on the outer layer 14. For example, if the tube 1 is required to have anti-static properties, a surface layer composed essentially of a resin having a volume specific resistance of about $10^2$ to $10^9$ Ω.cm may be coated on the outside of the outer layer 14. If the tube 1 is required to have a larger pressure resistance, a reinforcement layer composed essentially of synthetic fibers (such as nylon, vinylon, polyester, and aramid) and/or wires may be woven or wrapped on the outside of the outer layer 14.

Moreover, it is applicable to provide, as a reinforcement layer, a coating composed of a rubber tube and/or a thermoplastic elastomer, or to wind a coil tube around the tube 1 so as to prevent the tube 1 from being damaged from flying stones, fire, heat of the external air, and the like.

The Adhesive Layer 11

As for the adhesive resin to be used as the adhesive layer 11 in the five-layer tube 1 (shown in FIG. 1) for fuel transportation or in the four-layer tube 1 (shown in FIG. 2) for fuel transportation, the present invention does not intend to provide any further limitation, as long as the adhesive resin can be thermally melted with the innermost layer 10 and the middle layer 12 during coextrusion.

For example, in cases where the innermost layer 10 is composed of a fluorine type resin and the middle layer 12 is composed of a polyalkylene naphthalate resin, the adhesive resin to be used as the adhesive layer 11 between the innermost layer 10 and the middle layer 12 may be, preferably, a melted mixture including at least one compound (A) selected from the group consisting of fluorine type resins, flexible fluorine type resins, and fluorine type rubbers and at least one compound (B) selected from the group consisting of crystalline polyester type resins and polyester type elastomers. Moreover, in order to obtain a still more uniformly mixed adhesive resin and to increase the adhesive properties thereof, a composition obtained by melt-mixing one or more kinds of thermoplastic polyurethanes, polyamide type elastomers, modified polyolefins, or the like with the above-mentioned melted mixture may preferably be used. A composition obtained by melt-mixing with the use of a so-called miscibilizer containing an epoxy compound including glycidyl group or glycidyl ether group, an acid anhydride, oxazoline group, isocyanate group, carboxylic acid group, amino group, and the like may also be preferably used.

In cases where the innermost layer 10 is composed of a polyamide type resin and the middle layer 12 is composed of a polyalkylene naphthalate resin, the adhesive resin to be used as the adhesive layer 11 between the innermost layer 10 and the middle layer 12 may be, preferably, one or more kinds of thermoplastic polyurethanes, polyetherblockamides, polyesterblockamides, modified polyolefins, polyester copolymers, and polyester type elastomers.

Moreover, a composition obtained by melt-mixing a polyamide type resin and a crystalline polyester type resin and/or a polyester type elastomer may alternatively be used as the adhesive resin. In order to obtain a still more uniformly mixed adhesive resin and to increase the adhesive properties thereof, a composition obtained by melt-mixing one or more kinds of the above-mentioned adhesive resins may preferably be used. A composition obtained by melt-mixing with the use of a so-called miscibilizer containing carboxylic acid group, an acid anhydride, a compound having a (meth)acrylic acid or (meth)acrylic acid ester structure, an epoxy compound including glycidyl group or glycidyl ether group, oxazoline group, isocyanate group, amino group, hydroxyl group, and the like may also be preferably used.

As for the above-mentioned mixture of two or more kinds of adhesive resins to be used as the adhesive layer 11, the mixing ratio between the two adhesive resins should be such that sufficient and uniform adhesion is obtained between the innermost layer 10 and the middle layer 12.

In the above-mentioned adhesive resins to be used between a fluorine type resin and a polyalkylene naphthalate resin, the mixing ratio between the compound (A) and the compound (B) should be in the range of 80/20 to 30/70 by volume, a preferably in the range of 70/30 to 30/70 by volume. It is preferable to mix, if at all, any of the above-mentioned thermoplastic polyurethanes, polyamide type elastomers, modified polyolefins, and miscibilizers in a ratio, by volume, of 30% or less based on the mixture.

In cases where a polyamide type resin and a crystalline polyester type resin and/or a polyester elastomer is used as the adhesive resin to be used between a polyamide type resin and a polyalkylene naphthalate resin, the mixing ratio between the polyamide type resin and the crystalline polyester type resin and/or the polyester type elastomer should be in the range of 70/30 to 30/70 by volume, an preferably in the range of 60/40 to 40/60 by volume. In the case where a miscibilizer is mixed, it is preferable to mix the miscibilizer in a ratio, by volume, of 20% or less based on the mixture.

Although the present invention does not intend to provide any limitation to the thickness of the adhesive layer 11 as long as the adhesive layer 11 can function to realize adhesion between the innermost layer 10 and the middle layer 12 as described above, the thickness of the adhesive layer 11 should preferably account for 2% to 10% of the total thickness of the tube 1.

If the thickness of the adhesive layer 11 accounts for less than 2% of the total thickness of the tube 1, it becomes difficult to conduct stable molding of the tube 1, leading to nonuniform thickness of the respective layers. This may result in nonuniform adhesion between the layers 10 and 12. If the thickness of the adhesive layer 11 accounts for more than 10%, the thicknesses of the innermost layer 10, the middle layer 12, and the outer layer 14 must be decreased in order to obtain a tube having a predetermined diameter and a predetermined thickness, thus resulting in deviation from the intended tube characteristics according to the present invention.

The Adhesive Layer 13

As for the adhesive resin to be used as the adhesive layer 13 in the five-layer tube 1 (shown in FIG. 1) for fuel transportation, the present invention does not intend to provide any further limitation as long as the adhesive resin can be thermally melted with the middle layer 12 and the outer layer 14 during coextrusion.

The adhesive resin to be used for the adhesive layer 13 may be, for example, one or more kinds of thermoplastic polyurethanes, polyetherblockamides, polyesterblockamides, modified polyolefins, polyester copolymers, and polyester type elastomers.

Although the present invention does not intend to provide any limitation to the thickness of the adhesive layer 13 as long as the adhesive layer 13 can function to realize adhesion between the innermost layer 10 and the middle layer 12 as described above, the thickness of the adhesive layer 13 should preferably account for 2% to 10% of the total thickness of the tube 1.

If the thickness of the adhesive layer 13 accounts for less than 2% of the total thickness of the tube 1, it becomes difficult to conduct stable molding of the tube 1, leading to nonuniform thickness of the respective layers. This may result in nonuniform adhesion between the layers 10 and 12. If the thickness of the adhesive layer 13 accounts for more than 10%, the thicknesses of the innermost layer 10, the middle layer 12, and the outer layer 14 must be decreased in order to obtain a tube having a predetermined diameter and a predetermined thickness, thus resulting in deviation from the intended tube characteristics according to the present invention.

In cases where the middle layer 12 and the outer layer 14 can themselves be thermally melted with each other, there is no need to incorporate the adhesive layer 13 therebetween, and the tube 1 may be configured as a four-layer tube for fuel transportation.

The Tube 1 for Fuel Transportation

The tube for fuel transportation having the above-mentioned multilayer structure can itself be fabricated by a known coextrusion method, an extrusion coating method, or the like. For example, the tube can be efficiently fabricated by a coextrusion method with the use of a plurality of extruders and a tube die for multilayer composites, the number of the extruders corresponding to the configuration of the tube.

By such a molding method, a tube for fuel transportation can be obtained which includes an innermost layer composed essentially of a fluorine type resin or a polyamide type resin, a middle layer composed essentially of a polyalkylene naphthalate resin, and an outer layer composed essentially of a thermoplastic resin, the layers being bonded to form an integral four-layer (in the case no adhesive layer is provided between the middle layer and the outer layer) or five-layer (in the case where an adhesive layer is provided between the innermost layer and the middle layer and another adhesive layer is provided between the middle layer and the outer layer) tube. The resultant tube has, as will be described later with reference to the examples the present invention, excellent barrier action against fuels and excellent kink-proofness.

EXAMPLES

Hereinafter, the present invention will be described by way of examples.

The transmission rate and the kink-proofness of the tubes obtained in the following examples and comparative examples were evaluated by the following method.

A. Transmission Rate

The following sample liquids I and II were provided in a tube having an outer diameter of 8 mm, an inner diameter of 6 mm, and a length of 1000 mm, and left in an oven heated at 60° C. or in an oven heated at 40° C., whereby the temporal decrease in the weight of the sample liquid I or II was obtained. The decrease in the weight of either sample liquid was divided by the outer surface area of the tube and was calculated to give a value in the form of g/m²/day. The calculated value was defined as the transmission rate.

Sample liquid I (Fuel C): A mixture of a reagent-class toluene and a reagent-class isooctane mixed at a ratio of 1/1 by volume.

Sample liquid II: A mixture of Fuel C and methanol mixed at a ratio of 85/15 by volume.

B. Kink-Proofness

A tube having an outer diameter of 8 mm and an inner diameter of 6 mm was bent in a semi-circle shape, with the radius of the semi-circle being gradually decreased until the tube kinked. The value of the radius obtained immediately before the tube kinked was used as an indicator of the kink-proofness of the tube. Accordingly, a tube having a smaller radius obtained immediately before the generation of a kink is regarded to be more kink-proof.

Example 1

This tube 1, according to Example 1, includes an innermost layer 10 (thickness: 0.2 mm) composed essentially of nylon 11, an adhesive layer 11 (thickness: 0.05 mm) composed essentially of a thermoplastic polyurethane, a middle layer 12 (thickness: 0.1 mm) composed essentially of polybutylene naphthalate, an adhesive layer 13 (thickness: 0.05 mm) composed essentially of a thermoplastic polyurethane, and an outer layer 14 (thickness: 0.6 mm) composed essentially of nylon 11.

This tube 1 was obtained as follows. Each of nylon 11, polybutylene naphthalate, and a thermoplastic polyurethane was inserted into a corresponding one of three extruders. The nylon 11, the polybutylene naphthalate, and the thermoplastic polyurethane were plasticized while being processed at respective temperature ranges of 220° C. to 240° C., 230° C. to 250° C., and 190° C. to 210° C. Thereafter, a three-material five-layer tube having an outer diameter of 8 mm and an inner diameter of 6 mm was extruded from a three-material five-layer tube die maintained at 245° C.

Example 2

This tube 1, according to Example 2, includes an innermost layer 10 (thickness: 0.2 mm) composed essentially of nylon 11, an adhesive layer 11 (thickness: 0.05 mm) composed essentially of a modified polyolefin, a middle layer 12 (thickness: 0.1 mm) composed essentially of polybutylene naphthalate, an adhesive layer 13 (thickness: 0.05 mm) composed essentially of a modified polyolefin, and an outer layer 14 (thickness: 0.6 mm) composed essentially of nylon 11.

This tube 1 was obtained by the same manner by which the tube 1 of Example 1 was obtained except that the adhesive layers 11 and 13 were formed at a temperature range of 230° C. to 240° C.

Example 3

This tube 1, according to Example 3, includes an innermost layer 10 (thickness: 0.2 mm) composed essentially of nylon 11, an adhesive layer 11 (thickness: 0.05 mm) composed essentially of a mixture of a thermoplastic polyurethane and a polyester type elastomer mixed at a ratio of 5/5 by volume, a middle layer 12 (thickness: 0.1 mm) composed essentially of polybutylene naphthalate, an adhesive layer 13 (thickness: 0.05 mm) composed essentially of a mixture of a thermoplastic polyurethane and a polyester type elastomer mixed at a ratio of 5/5 by volume, and an outer layer 14 (thickness: 0.6 mm) composed essentially of nylon 11.

This tube 1 was obtained by the same manner by which the tube 1 of Example 1 was obtained except that the adhesive layers 11 and 13 were formed at a temperature range of 210° C. to 230° C.

Example 4

This tube 1, according to Example 4, includes an innermost layer 10 (thickness: 0.2 mm) composed essentially of nylon 11, an adhesive layer 11 (thickness: 0.05 mm) composed essentially of a mixture of a polyetherblockamide and a polyester type elastomer mixed at a ratio of 5/5 by volume, a middle layer 12 (thickness: 0.1 mm) composed essentially of polybutylene naphthalate, an adhesive layer 13 (thickness: 0.05 mm) composed essentially of a mixture of a polyetherblockamide and a polyester type elastomer mixed at a ratio of 5/5 by volume, and an outer layer 14 (thickness: 0.6 mm) composed essentially of nylon 11.

This tube 1 was obtained by the same manner by which the tube 1 of Example 1 was obtained except that the adhesive layers 11 and 13 were formed at a temperature range of 230° C. to 240° C.

Example 5

This tube 1, according to Example 5, has the same configuration as that of the tube 1 of Example 4 except that the middle 12 was formed by using polyethylene naphthalate instead of polybutylene naphthalate.

This tube 1 was obtained by the same manner by which the tube 1 of Example 4 was obtained except that the middle layer 12 was formed at a temperature range of 280° C. to 300° C., and the three-material five-layer tube die was heated at a temperature range of 270° C. to 280° C.

Example 6

This tube 1, according to Example 6, includes an innermost layer 10 (thickness: 0.2 mm) composed essentially of nylon 11, an adhesive layer 11 (thickness: 0.05 mm) composed essentially of a mixture of nylon 11, polybutylene terephthalate, and a thermoplastic polyurethane mixed at a ratio of 4/4/1 by volume, a middle layer 12 (thickness: 0.1 mm) composed essentially of polybutylene naphthalate, and an outer layer 14 (thickness: 0.65 mm) composed essentially of a polyester type elastomer.

This tube 1 was obtained as follows. Each of the resins used for the innermost layer 10, the adhesive layer 11, the middle layer 12, and the outer layer 14 was inserted into a corresponding one of four extruders. The resins were plasticized while being processed at respective temperature ranges of 210° C. to 240° C., 210° C. to 240° C., 230° C. to 250° C., and 220° C. to 240° C. Thereafter, a four-material four-layer tube having an outer diameter of 8 mm and an inner diameter of 6 mm was extruded from a four-material four-layer tube die maintained at 245° C.

Example 7

This tube 1, according to Example 7, includes an innermost layer 10 (thickness: 0.2 mm) composed essentially of nylon 11, an adhesive layer 11 (thickness: 0.05 mm) composed essentially of a mixture of nylon 11, a polyester type elastomer, and a modified polyolefin mixed at a ratio of 5/5/1 by volume, a middle layer 12 (thickness: 0.1 mm) composed essentially of polybutylene naphthalate, an adhesive layer 13 (thickness: 0.05 mm) composed essentially of a mixture of nylon 11, a polyester type elastomer, and a modified polyolefin mixed at a ratio of 5/5/1 by volume, and an outer layer 14 (thickness: 0.6 mm) composed essentially of nylon 11.

This tube 1 was obtained as follows. Each of nylon 11, polybutylene naphthalate, and a mixture of nylon 11, a polyester type elastomer, and a modified polyolefin mixed at a ratio of 5/5/1 by volume was inserted into a corresponding one of three extruders. The nylon 11, the polybutylene naphthalate, and the mixture of nylon 11, the polyester type elastomer, and the modified polyolefin were plasticized while being processed at respective temperature ranges of 220° C. to 240° C., 240° C. to 260° C., and 230° C. to 250° C. Thereafter, a three-material five-layer tube having an outer diameter of 8 mm and an inner diameter of 6 mm was extruded from a three-material five-layer tube die maintained at 260° C.

The transmission rate and the kink-proofness were measured for the tubes 1 of Examples 1 to 7. The measurement results are shown in Table 1 along with the configurations of the tubes 1. A larger transmission rate indicates a lower barrier action against fuels of the tube.

TABLE 1

| | Tube configuration [Outer diameter: 8 mm/inner diameter: 6 mm] | | | | |
|---|---|---|---|---|---|
| | innermost layer 10 | Adhesive layer 11 | Middle layer 12 | Adhesive layer 13 | Outer layer 14 |
| Example 1 | Nylon 11 | Thermoplastic polyurethone | Polybutylene naphthalate | Thermoplastic polyurethane | Nylon 11 |
| Example 2 | Nylon 11 | Modified polyolefin | Polybutylene naphthalate | Modified polyolefin | Nylon 11 |
| Example 3 | Nylon 11 | Mixture of thermoplastic polyurethane and polyester type elastomer at 5/5 | Polybutylene naphthalate | Mixture of thermoplastic polyurethane and polyester type elastomer at 5/5 | Nylon 11 |
| Example 4 | Nylon 11 | Mixture of polyetherblockamide and polyester type elastomer at 5/5 | Polybutylene naphthalate | Mixture of polyetherblockamide and polyester type elastomer at 5/5 | Nylon 11 |
| Example 5 | Nylon 11 | Mixture of polyetherblockamide and polyester type elastomer at 5/5 | Polyetylene naphthalate | Mixture of polyetherblockamide and polyester type elastomer at 5/5 | Nylon 11 |
| Example 6 | Nylon 11 | Mixture of nylon 11, polybutylene terephthalate, and thermoplastic polyurethane at 4/4/1 | Polybutylene naphthalate | — | Polyester type elastomer |
| Example 7 | Nylon 11 | Mixture of nylon 11, polyester type elastomer, and modified polyolefin at 5/5/1 | Polybutylene naphthalate | Mixture of nylon 11, polyester type elastomer and modified polyolefin at 5/5/1 | Nylon 11 |

TABLE 1-continued

|  | Transmission rate | | | Kink-proofness (Radius (mm)) obtained immediately before |
|---|---|---|---|---|
|  | Fuel C | Fuel C with 15% mehtanol | | generation of |
|  | (60° C.) | (60° C.) | (40° C.) | a kink |
| Example 1 | 0.01 | 1.7 | 0.15 | 23 |
| Example 2 | 0.009 | 1.5 | 0.14 | 25 |
| Example 3 | 0.008 | 1.4 | 0.13 | 20 |
| Example 4 | 0.01 | 1.8 | 0.17 | 20 |
| Example 5 | 0.015 | 2.0 | 0.20 | 25 |
| Example 6 | 0.008 | 1.5 | 0.12 | 20 |
| Example 7 | 0.009 | 1.7 | 0.15 | 20 |

Example 8

This tube 1, according to Example 8, includes an innermost layer 10 (thickness: 0.1 mm) composed essentially of polyvinylidene fluoride (PVDF), an adhesive layer 11 (thickness: 0.05 mm) composed essentially of a mixture of PVDF, polybutylene terephthalate, and a thermoplastic polyurethane mixed at a ratio of 4/4/1 by volume, a middle layer 12 (thickness: 0.1 mm) composed essentially of polybutylene naphthalate, an adhesive layer 13 (thickness: 0.05 mm) composed essentially of a thermoplastic polyurethane, and an outer layer 14 (thickness: 0.6 mm) composed essentially of nylon 11.

This tube 1 was obtained as follows. Each of the resins used for the innermost layer 10, the adhesive layer 11, the middle layer 12, the adhesive layer 13, and the outer layer 14 was inserted into a corresponding one of five extruders. The resins were plasticized while being processed at respective temperature ranges of 200° C. to 220° C., 200° C. to 220° C., 230° C. to 250° C., 190° C. to 210° C., and 220° C. to 240° C. Thereafter, a five-material five-layer tube having an outer diameter of 8 mm and an inner diameter of 6 mm was extruded from a five-material five-layer tube die maintained at 245° C.

Example 9

This tube 1, according to Example 9, includes an innermost layer 10 (thickness: 0.1 mm) composed essentially of a polyvinylidene fluoride-hexafluoropropylene copolymer, an adhesive layer 11 (thickness: 0.05 mm) composed essentially of a flexible fluorine type resin, a polyester type elastomer, and a thermoplastic polyurethane mixed at a ratio of 5/4/1 by volume, a middle layer 12 (thickness: 0.1 mm) composed essentially of polybutylene naphthalate, an adhesive layer 13 (thickness: 0.05 mm) composed essentially of a thermoplastic polyurethane, and an outer layer 14 (thickness: 0.7 mm) composed essentially of nylon 11.

This tube 1 was obtained by the same manner by which the tube 1 of Example 8 was obtained except that the innermost layer 10 was formed at a temperature range of 190° C. to 210° C.

Example 10

This tube 1, according to Example 10, includes an innermost layer 10 (thickness: 0.1 mm) composed essentially of an ethylene-tetrafluoroethylene copolymer (ETFE), an adhesive layer 11 (thickness: 0.05 mm) composed essentially of a flexible fluorine type resin, a polyester type elastomer, and a modified polyolefin mixed at a ratio of 2/5/3 by volume, a middle layer 12 (thickness: 0.1 mm) composed essentially of polybutylene naphthalate, and an outer layer 14 (thickness: 0.75 mm) composed essentially of a polyester type elastomer.

This tube 1 was obtained by using four extruders and a four-material four-layer tube die as in Example 6, the innermost layer 10 and the adhesive layer 11 being formed at respective temperature ranges of 230° C. to 260° C. and 220° C. to 240° C., and maintaining the tube die at 250° C. Thus, the four-material four-layer tube 1 was obtained.

Example 11

This tube 1, according to Example 11, includes an innermost layer 10 (thickness: 0.1 mm) composed essentially of an ethylene-tetrafluoroethylene copolymer (ETFE), an adhesive layer 11 (thickness: 0.05 mm) composed essentially of ETFE, polybutylene terephthalate, and ethyleneglycidyl methacrylate mixed at a ratio of 5/5/1 by volume, a middle layer 12 (thickness: 0.1 mm) composed essentially of polybutylene naphthalate, an adhesive layer 13 (thickness: 0.05 mm) composed essentially of nylon 11, a polyester type elastomer, and a modified polyolefin mixed at a ratio of 5/5/1 by volume, and an outer layer 14 (thickness: 0.6 mm) composed essentially of nylon 11.

This tube 1 was obtained as follows. Each of the resins used for the innermost layer 10, the adhesive layer 11, the middle layer 12, the adhesive layer 13, and the outer layer 14 was inserted into a corresponding one of five extruders. The resins were plasticized while being processed at respective temperature ranges of 270° C. to 290° C., 250° C. to 270° C., 240° C. to 260° C., 230° C. to 250° C., and 220° C. to 240° C. Thereafter, a five-material five-layer tube having an outer diameter of 8 mm and an inner diameter of 6 mm was extruded from a five-material five-layer tube die maintained at 260° C.

The transmission rate and the kink-proofness were measured for the tubes 1 of Examples 8 to 11. The measurement results are shown in Table 2 along with the configurations of the tubes 1.

TABLE 2

Tube configuration [Outer diameter: 8 mm/Inner diameter: 6 mm]

| | Innermost layer 10 | Adhesive layer 11 | Middle layer 12 | Adhesive layer 13 | Outer layer 14 |
|---|---|---|---|---|---|
| Example 8 | PVDF | Mixture of PVDF, polybutylene terephthalate, and thermoplastic polyurethane at 4/4/1 | Polybutylene naphthalate | Thermoplastic polyurethane | Nylon 11 |
| Example 9 | PVDF-hexafluoropropylene copolymer | Mixture of flexible fluorine type resin, polyester type elastomer, and thermoplastic polyurethane 5/4/1 | Polybutylene naphthalate | Thermoplastic polyuretane | Nylon 11 |
| Example 10 | ETFE | Mixture of flexible fluorine type resin, polyester type elastomer, and modified polyolefin at 2/5/3 | Polybutylene naphthalate | — | Polyester type elastomer |
| Example 11 | ETFE | Mixture of ETFE, polybutylene terephthalate, and ethylene.glycidyl methacrylate at 5/5/1 | Polybutylene naphthalate | Mixture of nylon 11, polyester type elastomer, and modified polyolefin at 5/5/1 | Nylon 11 |

| | Transmission rate | | | Kink-proofness (Radius (mm) obtained immediately before generation of a kink) |
|---|---|---|---|---|
| | Fuel C (60° C.) | Fuel C (60° C.) | with 15% mehtanol (40° C.) | |
| Example 8 | 0.004 | 0.9 | 0.07 | 26 |
| Example 9 | 0.005 | 1.1 | 0.09 | 23 |
| Example 10 | 0.007 | 0.5 | 0.03 | 22 |
| Example 11 | 0.006 | 0.4 | 0.01 | 25 |

Comparative Examples 1 to 5

The tube of Comparative Example 1 is a single layer tube (thickness: 1 mm) composed essentially of nylon 11.

The tube of Comparative Example 2 is a single layer tube (thickness: 1 mm) composed essentially of PVDF.

The tube of Comparative Example 3 is a single layer tube (thickness: 1 mm) composed essentially of ETFE.

The tube of Comparative Example 4 is a single layer tube (thickness: 1 mm) composed essentially of a polybutylene terephthalate resin.

The tube of Comparative Example 5 is a single layer tube (thickness: 1 mm) composed essentially of a polyethylene terephthalate resin.

Comparative Example 6

The tube of Comparative Example 6 includes an innermost layer 10 (thickness: 0.7 mm) composed essentially of a polybutylene terephthalate resin and an outer layer 14 (thickness: 0.3 mm) composed essentially of nylon 12.

Comparative Example 7

The tube of Comparative Example 7 is a single layer tube (thickness: 1 mm) composed essentially of cyclohexanedimethanol-ethyleneglycol-terephthalic acid copolymer.

Comparative Example 8

The tube of Comparative Example 8 includes an innermost layer 10 (thickness: 0.2 mm) composed essentially of nylon 12, a middle layer 12 (thickness: 0.2 mm) composed essentially of polybutylene terephthalate and an outer layer 14 (thickness: 0.6 mm) composed essentially of nylon 12.

Comparative Example 9

The tube of Comparative Example 9 includes an innermost layer 10 (thickness: 0.1 mm) composed essentially of nylon 12, a middle layer 12 (thickness: 0.15 mm) composed essentially of a mixture of a polybutylene terephthalate resin, nylon 12, and triphenylene phosphate mixed at a ratio of 50/50/0.1 by weight, and an outer layer 14 (thickness: 0.75 mm) composed essentially of nylon 12.

Comparative Example 10

The tube of Comparative Example 10 includes an innermost layer 10 (thickness: 0.1 mm) composed essentially of nylon 12, a middle layer 12 (thickness: 0.15 mm) composed essentially of a mixture of a polybutylene terephthalate resin and anhydride maleic acid modified EPM mixed at a ratio of 80/20 by weight, and an outer layer 14 (thickness: 0.75 mm) composed essentially of nylon 12.

Comparative Example 11

The tube of Comparative Example 11 includes an innermost layer 10 (thickness: 0.2 mm) composed essentially of nylon 12, a middle layer 12 (thickness: 0.2 mm) composed essentially of a mixture of a polybutylene terephthalate resin and an isocyanurate of isophorone diisocyanate mixed at a ratio of 90/10 by weight, and an outer layer 14 (thickness: 0.6 mm) composed essentially of nylon 12.

Comparative Example 12

The tube of Comparative Example 12 includes an innermost layer 10 (thickness: 0.2 mm) composed essentially of nylon 11, an adhesive layer 11 (thickness: 0.05 mm) composed essentially of a thermoplastic polyurethane, a middle layer 12 (thickness: 0.1 mm) composed essentially of polybutylene terephthalate, an adhesive layer 13 (thickness: 0.05 mm) composed essentially of a thermoplastic polyurethane, and an outer layer 14 (thickness: 0.6 mm) composed essentially of nylon 11.

Comparative Example 13

The tube of Comparative Example 13 includes an innermost layer 10 (thickness: 0.2 mm) composed essentially of nylon 11, a middle layer 12 (thickness: 0.1 mm) composed essentially of polybutylene naphthalate, and an outer layer 14 (thickness: 0.6 mm) composed essentially of nylon 11.

Comparative Example 14

The tube of Comparative Example 14 includes an innermost layer 10 (thickness: 0.1 mm) composed essentially of PVDF, an adhesive layer 11 (thickness: 0.05 mm) composed essentially of PVDF, polybutylene terephthalate, and a thermoplastic polyurethane mixed at a ratio of 4/4/1 by volume, a middle layer 12 (thickness: 0.1 mm) composed essentially of polybutylene terephthalate, an adhesive layer 13 (thickness: 0.05 mm) composed essentially of a thermoplastic polyurethane, and an outer layer 14 (thickness: 0.7 mm) composed essentially of nylon 11.

Comparative Example 15

The tube of Comparative Example 15 includes an innermost layer 10 (thickness: 0.1 mm) composed essentially of PVDF, a middle layer 12 (thickness: 0.1 mm) composed essentially of polybutylene naphthalate, and an outer layer 14 (thickness: 0.8 mm) composed essentially of nylon 11.

The transmission rate and the kink-proofness were measured for the tubes of Comparative Examples 1 to 15. The measurement results are shown in Table 3 and 4 along with the configurations of the tubes.

TABLE 3

| | Tube configuration [outer diameter: 8 mm/inner diameter: 6 mm] | | | | |
|---|---|---|---|---|---|
| | Innermost layer 10 | Adhesive layer 11 | Middle layer 12 | Adhesive layer 3 | Outer layer 14 |
| Comparative example 1 | Nylon 11 | — | — | — | — |
| Comparative example 2 | PVDF | — | — | — | — |
| Comparative example 3 | ETFE | — | — | — | — |
| Comparative example 4 | Polybutylene terephthalate resin | — | — | — | — |
| Comparative example 5 | Polyetylene terephthalate resin | — | — | — | — |
| Comparative example 6 | Polybutylene terephthalate resin | — | — | — | Nylon 12 |
| Comparative example 7 | Cyclohexanedimethanol-ethyleneglycol-terephthalic acid copolymer | — | — | — | — |
| Comparative example 8 | Nylon 12 | — | Polybutylene terephthalate | — | Nylon 12 |
| Comparative example 9 | Nylon 12 | — | Mixture of polybutylene terephthalate, nylon 12 and triphenylene phosphite at 50/50/0.1 | — | Nylon 12 |

| | Transmission rate | | | Kink-proofnees (radius (mm) obtained) |
|---|---|---|---|---|
| | Fuel C | Fuel C with 15% methanol | | immediately before |
| | (60° C.) | (60° C.) | (40° C.) | generation of a kink |
| Comparative example 1 | 1.2 | 60 or more | 60 or more | 20 |
| Comparative example 2 | 0.2 | 4.4 | 1.0 | 28 |
| Comparative example 3 | 1.0 | 2.8 | 0.5 | 28 |
| Comparative example 4 | 0.8 | 25 | 5.5 | 28 |
| Comparative example 5 | 0.7 | 28 | 5.8 | 30 |
| Comparative example 6 | 1.0 | 45 | 8.1 | 70 |
| Comparative example 7 | 0.1 | 40 | 8.6 | 28 |
| Comparative example 8 | 0.9 | 43 | 10 | 80 |
| Comparative example 9 | 1.2 | 60 or more | 25 | 25 |

TABLE 4

| | Tube configuration [outer diameter:8 mm/inner diameter:6 mm] | | | | | Transmission rate | | | Kink-proofness |
|---|---|---|---|---|---|---|---|---|---|
| | Innermost layer 10 | Adhesive layer 11 | Middle layer 12 | Adhesive layer 13 | Outer layer 14 | Fuel C (60° C.) | Fuel C with 15% methanol (60° C.) | (40° C.) | (radius (mm) obtained immediately before generation of a kink) |
| Comparative example 10 | Nylon 12 | — | Mixture of polybutylene terephthalate and anhydride maleic modified EPM at 80/20 | — | Nylon 12 | 1.3 | 60 or more | 18 | 28 |
| Comparative example 11 | Nylon 12 | — | Mixture of polybutylene terephthalate and isocaynurate of isophorone diisocyanate at 90/10 | — | Nylon 12 | 0.9 | 45 | 12 | 30 |
| Comparative example 12 | Nylon 11 | Thermoplastic polyurethane | Polybutylene terephthalate | Thermoplastic polyurethane | Nylon 11 | 0.5 | 52 | 11 | 23 |
| Comparative example 13 | Nylon 11 | — | Polybutylene naphthalate | — | Nylon 11 | 0.009 | 1.6 | 0.15 | 75 |
| Comparative example 14 | PVDF | Mixture of PVDF, polybutylene, terephthalate, and thermoplastic polyurethane mixed at 4/4/1 | Polybutylene terephthalate | Thermoplastic polyurethane | Nylon 11 | 0.3 | 16 | 2.8 | 26 |
| Comparative example 15 | PVDF | — | Polybutylene naphthalate | — | Nylon 11 | 0.004 | 0.9 | 0.07 | 90 |

Hereinafter, the barrier action and kink-proofness of the tubes 1 of Examples 1 to 11 will be compared with those of the tubes of Comparative Examples 1 to 15, with reference to Tables 1 to 4.

As seen from Tables 1, 2, and 3, the single tubes of all the Comparative Examples but Comparative Example 13 have a large transmission rate for the fuels, indicative of small barrier action when compared with those of the tubes 1 of Examples 1 to 11 made in accordance with the present invention. In particular, the common polyester resins used in Comparative Examples 4 to 7 have transmission rates which are several dozen times as large as the transmission rates of the multi-layer tubes 1 according to the present invention incorporating polybutylene naphthalate resins. As will be appreciated, polybutylene naphthalate has remarkably excellent barrier action against fuels.

The following is apparent from comparison between the tube 1 of Example 1 and the tube of Comparative Example 12. The tube of Comparative Example 12, although highly kink-proof owing to the presence of the adhesive layers 11 and 13, has a large transmission rate for the fuels, indicative of small barrier action against both Fuel C (Sample liquid I) and the alcohol-containing mixed fuel (Sample liquid II). As will be appreciated, polybutylene naphthalate provides far greater advantages than polybutylene terephthalate as a material for the middle layer 12.

The following is apparent from comparison between the tubes 1 of Examples 1 to 7 and the tube of Comparative Example 13. The tubes 1 of Examples 1 to 7 and the tube of Comparative Example 13 have only a small difference in barrier action for the fuels. However, the tube of Comparative Example 13 has considerably lower kink-proofness. Accordingly, the kink-proofness of the tubes 1 according to the present invention is remarkably improved by the incorporation of the adhesive layers 11 and 13.

The following is apparent from comparison between the tube 1 of Example 8 and the tube of Comparative Example 14. The tube of Comparative Example 14 has a large transmission rate for the fuels, indicative of several dozen times smaller barrier action against both Fuel C (Sample liquid I) and the alcohol-containing mixed fuel (Sample liquid II) than the barrier action of the tubes 1 of Example 8. As will be appreciated, polybutylene naphthalate provides far greater advantages than polybutylene terephthalate as a material for the middle layer 12.

The following is apparent from comparison between the tube 1 of Example 8 and the tube of Comparative Example 15. The tube 1 of Example 8 and the tube of Comparative Example 15 have only a small difference in barrier action against the fuels. However, the tube of Comparative Example 15 has considerably lower kink-proofness. On the other hand, the tube of Example 8 has improved kink-proofness. Accordingly, the kink-proofness of the tubes 1 according to the present invention is remarkably improved by the incorporation of the adhesive layers 11 and 13.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tube for fuel transportation comprising:
    an innermost layer comprising a polyamide resin,
    an intermediate layer surrounding the innermost layer and consisting of a polybutylene naphthalate resin having an intrinsic viscosity within the range of 0.9 to 1.5, an outer layer comprising a thermoplastic resin, an adhesive layer interposed between the innermost layer and the intermediate layer, and a second adhesive layer interposed between the intermediate layer and the outer layer, wherein the thickness of the intermediate layer represents between 5% and 10% of the total thickness of the tube.

2. A tube for fuel transportation according to claim 1, wherein the intrinsic viscosity is measured for a solution of 0.005 g/ml at 35° C. with o-chlorophenol used as a solvent, according to ASTM D 2857.

3. A tube for fuel transportation according to claim 1, wherein the intrinsic viscosity is measured for a solution of 0.005 g/ml at 35° C. with o-chlorophenol used as a solvent, according to ASTM D 2857.

an innermost layer having a thickness within the range of 0.1 to 0.3 mm and comprising a polyamide resin, an intermediate layer having a thickness within the range of 0.05 to less than 0.2 mm, surrounding the innermost layer and consisting of a polybutylene naphthalate resin having an intrinsic viscosity within the range of 0.9 to 1.5, an outer layer having a thickness within the range of 0.3 to 0.8 mm, comprising a thermoplastic resin, an adhesive layer having a thickness within the range of 0.02 and 0.1 mm, and interposed between the innermost layer and the intermediate layer, and a second adhesive layer having a thickness within the range of 0.02 to 0.1 mm, and interposed between the intermediate layer and the outer layer.

4. A tube for fuel transportation according to claim 3, wherein the intrinsic viscosity is measured for a solution of 0.005 g/ml at 35° C. with o-chlorophenol used as a solvent, according to ASTM D 2857.

5. A tube for fuel transportation comprising:

an innermost layer having a thickness within the range of 10 to 30% of the total thickness of the tube and comprising a polyamide resin, an intermediate layer having a thickness of about 10% of the total thickness of the tube surrounding the innermost layer and consisting of a polybutylene naphthalate resin having an intrinsic viscosity within the range of 0.9 to 1.5, an outer layer having a thickness within the range of 30 to 80% of the total thickness of the tube comprising a thermoplastic resin, an adhesive layer having a thickness within the range of 2 to 10% of the total thickness of the tube interposed between the innermost layer and the intermediate layer, and a second adhesive layer having a thickness within the range of 2 to 10% of the total thickness of the tube interposed between the intermediate layer and the outer layer.

6. A tube for fuel transportation according to claim 5, wherein the intrinsic viscosity is measured for a solution of 0.005 g/ml at 35° C. with o-chlorophenol used as a solvent, according to ASTM D 2857.

7. A tube for fuel transportation comprising:

an innermost layer comprising a polyamide resin, an intermediate layer surrounding the innermost layer and consisting of a polybutylene naphthalate resin having an intrinsic viscosity within the range of 0.9 to 1.5, and an outer layer comprising a thermoplastic resin, wherein the thickness of the intermediate layer of the tube represents between 5% and 10% of the total thickness of the tube.

8. A tube for fuel transportation according to claim 7, wherein the intrinsic viscosity is measured for a solution of 0.005 g/ml at 35° C. with o-chlorophenol used as a solvent, according to ASTM D 2857.

9. A tube for fuel transportation comprising:

an innermost layer having a thickness within the range of 0.1 to 0.3 mm and comprising a polyamide resin, an intermediate layer having a thickness within the range of 0.05 to less than 0.2 mm, surrounding the innermost layer and consisting of a polybutylene naphthalate resin having an intrinsic viscosity within the range of 0.9 to 1.5, and an outer layer having a thickness within the range of 0.3 to 0.8 mm, comprising a thermoplastic resin.

10. A tube for fuel transportation according to claim 9, wherein the intrinsic viscosity is measured for a solution of 0.005 g/ml at 35° C. with o-chlorophenol used as a solvent, according to ASTM D 2857.

11. A tube for fuel transportation comprising:

an innermost layer having a thickness within the range of 10 to 30% of the total thickness of the tube and comprising a polyamide resin, an intermediate layer having a thickness of about 10% of the total thickness of the tube surrounding the innermost layer and consisting of a polybutylene naphthalate resin having an intrinsic viscosity within the range of 0.9 to 1.5, and an outer layer having a thickness within the range of 30 to 80% of the total thickness of the tube comprising a thermoplastic resin.

12. A tube for fuel transportation according to claim 11, wherein the intrinsic viscosity is measured for a solution of 0.005 g/ml at 35° C. with o-chlorophenol used as a solvent, according to ASTM D 2857.

* * * * *